United States Patent [19]

Totino et al.

[11] 4,170,659
[45] Oct. 9, 1979

[54] FRIED DOUGH PRODUCT AND METHOD

[75] Inventors: Rose W. Totino; James R. Behnke, both of Minneapolis; Jack D. Westover, St. Paul; Richard L. Keller, Minneapolis, all of Minn.

[73] Assignee: The Pillsbury Company, Minneapolis, Minn.

[21] Appl. No.: 816,641

[22] Filed: Jul. 18, 1977

[51] Int. Cl.² .............................................. A23L 1/01
[52] U.S. Cl. ..................... 426/95; 426/100; 426/138; 426/289; 426/302; 426/439; 426/440; 426/502
[58] Field of Search ................. 426/138, 94, 439, 283, 426/496, 92, 95, 99, 103, 289, 296, 302, 440, 560, 450, 89, 100, 502; 99/404

[56] References Cited

U.S. PATENT DOCUMENTS

| | | | |
|---|---|---|---|
| 1,646,921 | 9/1926 | Loose | 426/560 |
| 3,376,806 | 4/1968 | Magnusson | 426/496 |
| 3,379,141 | 4/1968 | Groth | 426/502 |
| 3,539,356 | 11/1970 | Benson | 426/496 |
| 3,608,474 | 9/1971 | Liepa | 99/404 |
| 3,615,678 | 10/1971 | Tangel et al. | 426/94 |
| 3,615,679 | 10/1971 | Tangel et al. | 426/94 |
| 3,635,149 | 1/1972 | Smith et al. | 426/496 |
| 3,722,400 | 3/1973 | Jimenez | 99/404 |
| 3,733,202 | 5/1973 | Marmor | 426/496 |
| 3,845,219 | 10/1974 | Federico | 426/19 |
| 3,851,569 | 12/1974 | Madrid | 426/496 |
| 3,879,564 | 4/1975 | Cocozzella | 426/138 |
| 3,922,370 | 11/1975 | Prakash | 426/440 |
| 3,928,638 | 12/1975 | Stickle | 426/496 |
| 3,937,848 | 2/1976 | Campbell | 426/439 |
| 3,950,550 | 4/1976 | Katayama | 426/94 |
| 3,966,983 | 6/1976 | Dexter et al. | 426/496 |
| 3,989,858 | 11/1976 | Williams | 426/496 |

FOREIGN PATENT DOCUMENTS 851132  9/1970  Canada .................... 426/808

OTHER PUBLICATIONS

Luigi Carnacina's Great Italian Cooking, M. Sonimo, 1968, p. 197.
Italian Food, Elizabeth David, 1958, p. 146.
Italian Family Cooking, E. Giobbi, 1971, p. 232.
Italian Cooking Home Style, Paulene Banese, 1974, p. 165.

*Primary Examiner*—Raymond N. Jones
*Assistant Examiner*—Elizabeth A. Hatcher
*Attorney, Agent, or Firm*—Mart C. Matthews; Michael D. Ellwein

[57] ABSTRACT

A delamination resistant fried dough product such as a pizza shell having a unique structure is described. It is composed of a flat at least partially fried body of soft porous dough and crispable outer crust with a plurality of blisters having generally hemispherical upwardly extending domed upper surfaces. The blisters usually contain one or more cavities substantially larger in size than the pores of the dough. The blisters are spaced apart from one another laterally and ligaments of dough are located between the blisters to connect the upper and lower surfaces of the crust for the purpose of unifying the crust and preventing the top portion of the crust from becoming delaminated from the lower portion during the frying process. After the crust has cooled, a topping, such as a pizza topping, sugar or glaze, fruit, cheese, egg, custard, etc. is applied to the top surface of the crust which is then usually frozen.

21 Claims, 14 Drawing Figures

```
COMPOUND DOUGH
      ↓
SHEET AND DOCK
      ↓
CUT INTO PIECES
      ↓
    PROOF
      ↓
EXPOSE TO HEATING
MEDIUM WHILE AT
LEAST PARTIALLY
CONFINED TO CON-
TROL BLISTER
DEVELOPMENT
      ↓
REMOVE EXCESS FAT
FROM SURFACE
      ↓
ALLOW TO COOL, PREF-
ERABLY 70°F OR LOWER
      ↓
APPLY TOPPING
      ↓
    FREEZE
```

FRIED DOUGH PRODUCT AND METHOD

FIELD OF THE INVENTION

The invention relates to prepared foods and more particularly to farinaceous foods that have been partially or completely cooked e.g., by frying that are adapted to be distributed in a fresh or frozen condition.

The Prior Art

An important application of the fried dough food products described in the present invention is the production of pizza shells. Accordingly, the invention will be described by way of example in connection with pizza production and particularly in connection with the manufacture of complete pizzas distributed in a refrigerated or frozen condition through the retail or institutional trade.

Pizzas now produced for frozen distribution have certain inherent shortcomings. A common objection is that the dough shell after being reheated for serving has a somewhat leathery or cardboard like texture. Other frozen pizzas when served are too much like a cracker in consistency and cells within the dough are small and undeveloped so that when such a pizza is reheated, it becomes rather hard unlike a homemade pizza. On the other hand, some pizzas are too moist or even soggy in the center, especially when heated on a cookie sheet. This is believed to be due in part to steam being unable to escape causing condensing on the bottom of the crust and in part to previous moisture migration from the topping into the crust.

In the course of developing the present invention frying the dough shell was attempted instead of baking it in an oven. Fried pizza or pizza Neopolitan style as it is sometimes referred to, is a method of making pizzas in the Naples area of Italy. The Neopolitan pizza is made from a ball of dough which is pressed with the fingers into a flat sheet that is then fried in a fat filled skillet first on one side and then on the other. While the crust is hot, a topping of cheese, heated meat and optionally heated tomato sauce is applied so that the heat of the crust melts the cheese. It was found by us that preparing a pizza in this manner has its own problems. First, turning the crust over mechanically, while possible, is difficult to accomplish in production with large size pizzas. Even more importantly, the finished dough shell lacks uniformity, frequently has markedly fluted edges, i.e., up and down undulations around the edge which make it difficult to package. Furthermore, parts may be thick and bready while other parts are thin, overly crisp, extremely fragile and the top may delaminate from the bottom producing something resembling a large hollow pillow. Sometimes the cook will poke the pizza with a fork while it is fried in an attempt to release gas but the finished product is often very inconsistent and a variety of shapes result. This is unacceptable in a commercial operation.

In addition, there is so much variation in height, i.e., thickness from one pizza shell to another that it is difficult or impossible to fit them into commercial packaging which is of necessity all the same size. When it is realized that a single factory may produce millions of pizzas per year, excessive product height can be a great disadvantage since a reduction in package height by ⅛ inch might save hundreds of thousands of dollars each year. Moreover, most people consider the Neopolitan pizza only suited as a freshly prepared product for use in homes or restaurants. In addition, fat absorption during frying causes the fat content to be very high. It may range up to about 16% to 22% after frying. This is of course, undesirable for many people from a dietary standpoint and provides an increased likelihood of fat rancidity problems in shipment and storage.

Objects

The major object of the invention is to provide an improved fried dough shell product with the following characteristics and advantages and suited for use as a pizza shell or if desired, with other toppings such as sugar, fruit, cheese, egg or the like. (a) better taste and texture than pizzas now being distributed in a frozen condition, (b) a substantial reduction in fat absorption compared with a Neopolitan fried pizza shell, viz. about half as much, (c) maintenance and control of size, shape and height, (d) provision for controlling the texture with the crust being capable of becoming relatively crisp after reheating while the interior has the desired moist bread-like texture, (e) the provision in one preferred embodiment of a pizza shell having relatively large domed shaped upwardly projecting bumps or blisters of controlled size and texture, (f) the provision of a more effective moisture barrier for retarding moisture migration from the topping to the crust, (g) suitability for automated production, (h) the capability of keeping quality during storage in a frozen condition for several months, (i) better resistance to repeated freezing and thawing than a conventional frozen pizza, (j) the capability of being crisp on the exterior even when reheated to serving temperature on a cookie sheet, and (k) provision is made for a predetermined closely controlled maximum height of the finished shells so that the product fits standardized boxes.

In the accomplishment of the foregoing and related advantages and objectives, this invention then comprises the features hereinafter fully described and particularly pointed out in the claims, the following description setting forth in detail certain illustrative embodiments of the invention by way of example these being indicative, however, of but a few of the various ways in which the principles of the invention may be employed.

SUMMARY OF THE INVENTION

Briefly, the invention provides a delamination resistent fried dough product having a generally flat porous body composed of at least partially fried dough. The upper surface of the fried dough in most preferred embodiments has a plurality of domed shaped bumps or blisters. The blisters are spaced apart generally throughout most of the width and breadth of the product and each includes a generally hemispherical domed upper surface. The blisters preferably have a predetermined maximum height and preferably are located relative to one another in predetermined positions. The blisters usually have one or more interior cavities which are substantially larger in size than the size of the pores of the dough. These cavities are often at least twice the size of the pores of the dough but frequently much larger, e.g., 10 times as large and separate each blister into upper and lower dough layers which comprise the top and bottom of each blister. Between the blisters, ligaments of dough connect the upper and lower surfaces to thereby unify the product and prevent delamination of the entire upper surface from the entire lower surface during frying. The product also preferably includes docking holes. In addition, moisture is largely displaced from all surfaces and fat is contained in its place.

The invention also concerns a frying process for dough products which comprises providing a sheet of dough which can be made in any suitable manner such as sheeting or stamping etc. The dough sheet is confined during frying at least sufficiently to control blister development. The fried sheet is then preferably cooled, a topping applied and the composite frozen.

Before frying the dough sheet is preferably docked by punching holes through it. It is then cut into pieces of the required size usually, but not necessarily, circular in shape and is preferably proofed. In the frying process the dough is exposed to an intense heat by contacting it with a heating medium, particularly a liquid heating medium such as hot fat while it is at least partially confined to control blister development. The dough is then allowed to cool preferably to about 150° F. or below, a topping is applied and the product is preferably frozen for distribution unless consumed so soon that freezing has no advantage.

DETAILED DESCRIPTION OF THE INVENTION

The invention is particularly well suited for use in connection with preparing pizza shells and will be described as such by way of example below, although they can be used for other applications such as sugared products or products to which a topping comprising glazing, frosting, fresh or cooked fruit, cheeses, quiche lorraine, etc. is applied.

The fried dough products of the present invention can be prepared from any good bread dough, pizza dough or pastry dough containing either yeast or chemical leavening, yeast leavening being preferred. Certain preferred dough formulas will be described below and in the examples.

Figure 1:
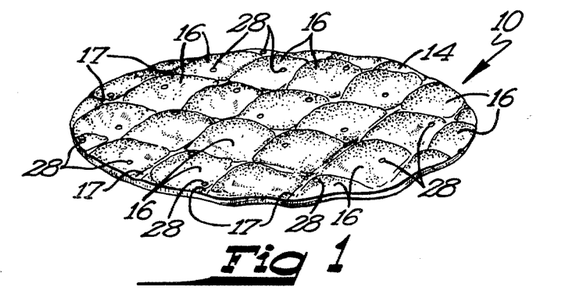
FIG. 1 is a perspective view of a fried dough product embodying the invention.
Figure 2:
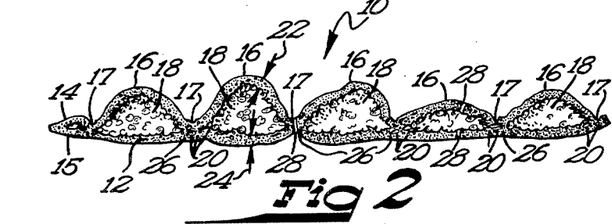
FIG. 2 is a cross section taken on line 2—2 of FIG. 1.

Refer now to FIGS. 1 and 2 in which is shown a fried dough product or dough shell such as a pizza shell 10. The pizza shell 10 is relatively flat and in this case circular in shape and is composed of a porous body of at least partially cooked and more specifically fried, dough 12. The term "partially fried" means that while the crumb structure is completely set and the starch gelatinized, the crust color may be so light as to appear uncooked, that is to say, little if any darker than the interior of the dough. By contrast, a completely fried dough product would have a golden or brownish cast to the crust.

The upper surface 14 of the dough shell 10 is characterized by having a plurality of laterally spaced bumps or blisters 16 arranged in rows and columns across the dough shell. The blisters 16 are generally hemispherical or domed upwardly extending projections on the top surface 14. While not essential, each of the bumps or blisters 16 has one or more relatively large cavities 18 inside that is simply a hollow air cell formed in the frying operation. The cells 18 are much larger in size than the pores 20 of the dough and usually at least twice the size of the pores. Frequently however, one or two very large cavities 18 occupy each blister 16 and in that situation the size of the cavities 18 are very commonly ten times or more the height and width of an average pore 20 within the dough. The pores 20 are located in the moist, tender and chewy interior dough 12 having a texture like that of the interior of a loaf of bread. As can be seen best in FIG. 2 the cavities 18 in effect separate the fried dough product into an upper dough layer 22 and a lower dough layer 24 which comprise the top and bottom of each of the blisters. Ligaments 26 of at least partially fried dough are located between the blisters so as to connect the upper and lower dough layers 22 and 24. This unifies the fried dough shell and helps to prevent delamination of the entire upper portion from the entire lower portion or surface of the product during frying.

In a typical situation, the blisters might have a height of about an inch or a little less from the top surface of the blister to the bottom surface of the blister and the ligaments 26 between the blisters in such a case would be spaced about 1¼ inches apart. A typical cavity within one of the blisters would be about ¾ of an inch in height. The texture contrast and heterogeniety in texture between the crisp crust and the tender interior bready consistency is very well liked and much preferred to prior frozen pizza distributed through commercial channels. Moreover, the product of the invention is much more uniform particularly with respect to height and texture in that it does not contain either soggy or overdone hard spots. The ratio of the thickness of blisters 16 to the thickness of ligaments 26 is usually about 3:1 to 5:1 for the product of FIGS. 1 and 2.

The fried dough product according to the invention is characterized by having a predetermined controlled maximum thickness from the top surface to the bottom surface. For example, if it is determined that the maximum thickness of the fried dough shell should be ¾ inch, then a substantial number of the blisters 16 will have that thickness ± a small fraction of an inch and none will exceed a predetermined thickness. This allows the finished product including a topping when present to be inserted into a box of a standard fixed height. By contrast, tests showed the range from thickest to thinnest is more than 0.312 inches greater with the Neopolitan pizza than the present invention. These dimensions, it should be understood are not at all critical and are merely presented by way of example to illustrate one application of the invention in the manufacture of pizza shells.

The fried dough shell is also characterized by having a multiplicity of docking holes 28 that extend all the way from the top surface 14 to the bottom surface 15. These holes are usually about ⅛ of an inch in diameter but the preferred pin diameter can range down to about 3/32 inch. Holes smaller than this may fuse increasing the tendency for delamination i.e. ballooning. If the pins are much larger than ¼ inch, the dough shell appears perforated allowing cheese and sauce to run through. Excellent results have been obtained by having docking holes spaced about 1 inch apart. Because of their exposure to the intensely hot cooking or frying medium, the dough in and around the docking holes become cooked fairly hard thereby defining a rivet like bond which connects the upper and lower surfaces sometimes at the location of the ligaments 26 and sometimes in other locations to provide additional secure connection between the upper and lower surfaces thereby further reducing the risk of delamination. One of the rivet-like bonds around a docking hole can be seen at 28 in FIG. 2.

The crust or surfaces 14 and 15 of the fried dough product is quite dense and lacks pores compared with the interior. As mentioned above it is preferred to have a very light color comparable to that of the interior dough but can if desired be fried until substantially darker, even medium or dark golden brown. The lighter colors are however, preferred since when applied to the production of pizzas, reheating can overcook or burn the fried shell if it is already a golden or dark brown. The surface of the crust after reheating becomes crunchy and crisp. It is usually 1/32 to 1/16 of an inch thick and is characterized by containing little if any moisture and very much less moisture than the interior dough 12.

Moisture contained in the surface dough i.e. crust prior to frying is largely driven off and replaced during frying with fat. Part of the fat rests on the surface of the dough and part of it is absorbed or incorporated into the dough crust at the surface, particularly the outermost layer of dough about 1/32 to 1/16 inch thick. The fat in this layer has three important benefits. First, it serves as a moisture barrier to prevent absorption of moisture from the surface. Second, it tends to preserve the crisp character of the crust surface 14 and 15. A third advantage is that it gives the product a fried flavor on the surface where it is most effective without excessively increasing the fat content in the interior of the product.

The bottom surface 15 of the fried shell is irregularly shaped and while some downwardly extending domed shaped extensions are present, most of which are located in vertical opposition to the upwardly extending domed shaped projections 16, they do not extend as far. Accordingly, the bottom surface can be best described as irregular in surface contour.

The blisters 16 can be spaced apart at regular intervals or at irregular intervals as will be described below. When a confining or submerging element is provided for engaging the dough and holding it while it is exposed to the hot fat or other fluid heating medium, the confining element can have regularly or irregularly spaced apart dough engaging elements described below that determine where the blisters are located. In the alternative, the confining element can be used to control only the maximum height of the blisters and not their location in which case the location and spacing of the blisters will be entirely random and different for each pizza produced. The maximum height of the blisters is however controlled as described below.

The most pleasing fat content for the product seems to be about 5% to 10%. by weight. Of this fat about 1% is incorporated in the dough during mixing and the rest is added during frying.

Figure 3:
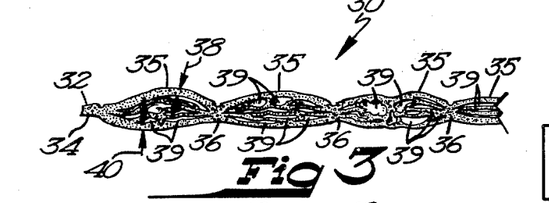
FIG. 3 is a vertical cross sectional view similar to FIG. 2 of a modified form of fried dough product.

Refer now to FIG. 3 which illustrates a modified form of fried dough product in accordance with the invention is a view similar to FIG. 2. As seen in FIG. 3 the fried dough product 30 includes upper surface 32 and lower surface 34, the upper surface having a plurality of bumps or blisters 35 distributed across its width and breadth. The blisters are separated by ligaments of cooked dough 36 connecting the upper and lower dough layers 38 and 40 all generally as described above in connection with FIGS. 1 and 2. It will be seen however that each of the bumps or blisters 35 are not as large as the embodiment of FIGS. 1 and 2 and contain a plurality of cavities 39 which are not much larger in size than the pores 40 of the dough. For example, the pores in the dough may be about ⅛ to 3/16 of an inch in diameter while the cavities 38 that form or define each blister 35 may be about two or three times that size but are usually much larger. Some of the blisters 35 contain only one cavity 39, others may contain two or three. The difference between the product of FIGS. 1 and 2 and FIG. 3 is determined primarily on how much the dough expands as it cooks. For example, if less leavening gas or water available for forming steam is present in the dough as a result of reducing the proofing time, the structure of FIG. 3 may result. Similarly, by increasing the weight or thickness of the dough piece, the product will become more like that in FIG. 3. For example, in preparing a pizza shell from 150 grams of dough ten inches in diameter and five millimeters thick, the product will resemble that of FIGS. 1 and 2, however, if the dough thickness is increased to 8 millimeters and the weight is 200 grams the product will more closely resemble FIG. 3 with frying carried out under the same conditions. While the reason is not known with certainty it is theorized that when the dough sheet is thicker, the inside becomes heated more slowly and this in turn reduces the amount of puffing or separation of the upper layer 38 from the lower layer 40. The crust, the oil in the surface layer and the docking holes are otherwise the same as described above. The invention can be applied to both conventional crust pizza and the so-called thick crust pizza which has a more bready interior.

The texture of the product of FIG. 3 is more bready and heavy than that of FIGS. 1 and 2. Many consumers prefer a product of this kind to one that is relatively light and crisp and puffy as illustrated in FIG. 2, however, the product illustrated by FIG. 2 is preferred by most consumers.

Figure 4:
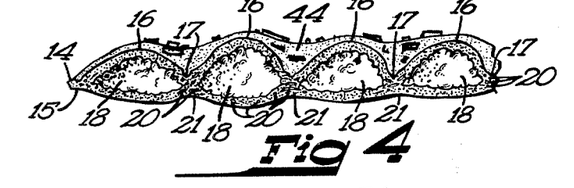
FIG. 4 is a view similar to FIG. 2 after the topping has been applied.

Refer now to FIG. 4 which illustrates a cross sectional view similar to FIG. 2 after the application of a topping, glazing, or the like to the upper surface 14 of the fried dough sheet. When pizzas are being produced, the topping 44 comprises the usual pizza topping ingredients, viz. tomato sauce, cheese with or without meat, mushrooms, anchovies and condiments such as olives, etc.

Figure 5:
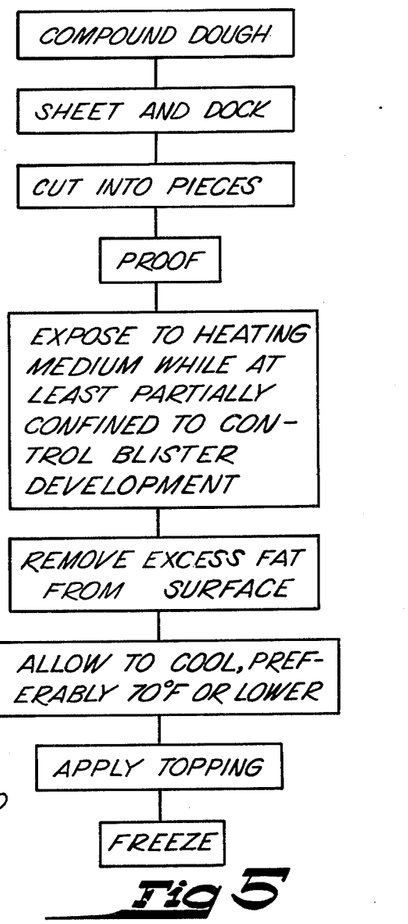
FIG. 5 is a flow chart illustrating major steps performed in accordance with one preferred process of the invention.

Refer now to FIG. 5 which depicts a flow chart illustrating one preferred method for producing the invention. As a first step in the process, the dough is prepared as mentioned above. The dough may be any good bread or pizza dough. Dough utilizing wheat flour is highly preferred. The term "pizza dough" used herein has the same meaning as bread dough but it should be understood that the preferred pizza doughs are those with relatively high flour protein content. However, since the bread and pizza formulas overlap, no specific formula limitations are to be intended by the use of the term "pizza dough." Some other doughs can be used such as pastry dough and particularly pastry dough containing yeast and/or chemical leavening. The dough after being prepared is rolled into sheets using any conventional well known equipment such as a roll stand having one or more sets of cooperating pairs of vertically spaced parallel horizontal driven rolls or if desired by stamping dough balls etc. in which case cutting to circular shape is unnecessary. The term "sheet" means a flat piece formed by any means whatsoever. After mixing and before sheeting the dough is allowed to rest at room temperature for about 40 minutes to provide time for yeast development, dough texture changes and leavening gas development. Once the dough has been sheeted to the desired thickness, generally 2–10 mm. but preferably about 4–6 mm. thick, the dough is docked by piercing it with pins about ⅛ of an inch in diameter throughout its width and breadth. Outstanding results have been achieved with the pins spaced about 1 inch apart. The sheeted dough is then cut into pieces of any desired shape and proofed at say 115° F. for 5 minutes at 80% to 90% relative humidity to allow the dough to rise.

The sheeted, cut and proofed product is then exposed to an intensely hot non-aqueous fluid heating medium while at least partially confined to control blister development. The confinement of the product has reference particularly to confinement of the height of the product since it is the height of the product that has been found important to control for the purpose of packaging. It was found when pizza shells are being prepared by frying in hot fat that the product does not expand or grow substantially in the lateral direction but rather quickly expands in the vertical direction and it is excessive expansion in the vertical direction that is particularly troublesome. Two examples will be given illustrating the way the product can be confined to control blister development. In the first, the product is placed in contact with a dough shell engaging member having a lower surface that touches the dough shell and includes a plurality of recesses separated by dough engaging members that touch the upper surface of the dough at spaced apart locations. When the flat dough bodies are carried through the hot fat, the buoyancy force of the fat lifts up and tends to confine the bottom portion of the product while the spaced dough engaging members confine the top. The bumps or blisters then expand upwardly between the dough engaging members and into the recesses. The blisters stop expanding after a certain point is reached because the crumb structure becomes set as a result of heating and probably also because the leavening gas and steam can expand no further. An important advantage is that the maximum height of the blisters and the overall height of the dough piece is reliably controlled. Moreover, the total height of the blisters is related to their distance across i.e., the distance between the dough engaging members so that by using larger openings, blisters of greater height can be produced. Correspondingly, by reducing the size of the openings the maximum blister height can be reduced. In this way the overall thickness of the final dough shell can be accurately and reliably controlled. At the same time the blisters themselves provide extreme contrast in texture from the very delicate, light and crisp crust to absence of material in the hollow interior and even an ordinary moist bread texture between blisters.

In another method of confining the product to control blister development, the product is held between parallel perforated or non-perforated relatively flat dough engaging surfaces during frying. As the product fries, the blisters develop randomly but upon reaching the upper and lower dough engaging surfaces the blister development is controlled since they cannot expand further, so that, for example, when a 1¼ inch thick pizza shell is required, the height of many of the blisters will be precisely 1¼ inches and none will exceed that height. It should be understood of course that some will not be that thick. Once the principles of the invention are understood, it will be seen that there are many ways of at least partially confining the dough product during frying to control blister development.

After frying, the product is preferably allowed to cool before the topping is applied and it is preferred to cool the product at least below the softening point of the components used in the topping. It is best to cool the product to 150° F. or below and even better to room temperature, i.e., 70° F. or below before the topping is applied. It was discovered that by cooling the fried dough shells before adding topping, certain benefits are obtained. First, the surface fat added during the frying operation tends to become more impenetrable by the moisture contained in the topping. Second, the topping is not melted or heated by the crust. Heating, if allowed to occur, reduces the viscosity of the topping and allows it to flow into pores or openings in the crust. Finally, cooling of the fat layer helps prevent the formation of peroxides and free fatty acids which are the primary causes of fat rancidity.

The topping is applied in any convenient well known manner, and especially by the application by commercially available machinery for applying pizza topping.

After the topping is applied the product is complete. If local distribution is desired, the product can be distributed at room temperature and needs only to be heated in the oven by the housewife. If wider distribution is desired, the product is frozen, packaged and distributed in a frozen condition. Freezing is greatly preferred since it has a cooperative effect with the fat layer to prevent moisture migration from the topping to the crust.

The effects of changing some of the most important process variables will now be described by way of example in connection with the production of pizza shells. In this application a preferred composition of wheat flour about 55% to 68% by weight, water about 26% to 40% by weight, leavening, e.g. active dry yeast, about 0.5% to 4.5%, optionally seasoning such as salt 0.5% to 3.5% and mixed-in shortening, e.g. soy oil 0.5% to 5%. One very good formula is wheat flour 60% to 62% (11.8% protein), water 35% to 37%, active dry yeast 1.0% to 1.5%, emulsifier (for example Reduce 150 by Patco Products Company of Kansas City, Missouri), 0.2% to 0.5% shortening 0.5% to 1%, and salt 0.8% to 1%. Dough temperature after mixing is about 85° F.

In order to evaluate the effect of changes in the formula and the mixing and cooking procedure on the final pizza shell characteristics, the following formulas were evaluated. All numerical amounts herein are expressed as percent by weight: wheat flour 60%, 62%, or 63%, water 32.8%, 36.1% or 36.8%, shortening (soy oil) 0.80% or 0.82%, dough conditioner (Reduce 150) 0.30% or 0.31%, active dry yeast 0.78%, 1.28% or 1.3%, salt 0.92% or 0.93%. The proof times were either 5 minutes, 10 minutes, 20 minutes, or 30 minutes at 90% relative humidity and 90° F. Docking of the dough was with ⅛ inch diameter docking pins either 1 inch apart or 2 inches apart. The frying temperature was varied from 375° F. to 425° F. Submerged frying, surface frying, and flowing hot fat over the surface of the product were all tested.

The results of these tests will now be summarized. It was discovered that an increase in either the rest time of the dough, that is the time between mixing and sheeting or the proofing time (either within a proofing box or open to the atmosphere) produces the same effect since both promote yeast growth. While the proofing of the dough is not utterly essential for the operation of the invention, good results are produced if the proofing time is between about ½ and 15 minutes in duration. The best results were obtained with the particular formulas used when the proofing time was about 5 to 15 minutes. It was found, for example, that within 30 minutes of proofing, the crust after reheating was judged by most taste panel members to be too crunchy, i.e., crackery in texture and having a somewhat dry eating consistency which is undesirable. It also produced what was regarded to be too much ballooning of the dough. On the other hand with no proofing, this formula will often produce dough pieces that tend initially to sink to the bottom of the frying vessel or which fold during frying thereby destroying the product. Unproofed products were also regarded to be excessively dense, oily, doughy or leathery in texture. These results can however, be modified with various techniques known to the art such as gas injection, chemical leavening, mixed chemical and yeast leavening etc. Thus, proofing while highly preferred is not essential. It is however preferred that the dough be proofed for about 5 minutes at 115° F. and a 90% relative humidity. Some of the best results have been achieved in pizza crust production with an initial dough moisture of 36% by weight, a final dough moisture after frying of 26% to 36% by weight and a total time of proofing plus resting at room temperature of about 45 minutes.

Concerning the location of frying within the frying fat it was found that it is easier to control the formation of blisters or bumps in the dough if the pizza shells are submerged beneath the surface of the fat. However, they can be floated on the surface if hot fat is applied to the top surface for example by being poured, sprayed or otherwise applied more or less continuously. It was discovered that the depth of submersion is not critical but the best results are obtained at a submersion depth of between about ⅛" and ⅜" between the fat surface and the top of the pizza shell. An effect was noted in the crust characteristics when the submersion depth was changed from ⅛" to ⅜". A relatively flatter bready type crust results when the crust surface is barely covered with frying oil i.e. at ⅛" submersion. Extensive blistering or bump formation occurs on the surface of the pizza shell when the shell is submerged at depths from between ¼" and 2⅛" or more. Accordingly, blistering characteristics can be controlled by frying fat level adjustment. Using the particular formulas chosen, and frying for 40 seconds at 400° F., most taste panel members appear to prefer the pizza shells in which the tops of the blisters were at a depth of about ¼" below the surface of the frying fat.

If on the other hand the pizza shells are fried by floating them without confinement on the surface and turned over half way through the frying cycle, delamination or ballooning of the entire upper surface of the pizza shell away from the entire lower surface occurs fairly often. Such a product is unacceptable. Moreover, the thickness is uncontrolled and hard spots as well as soggy spots develop. The color distribution is also less uniform than when fried while confined to control blister development.

It was found that while docking of the pizza shells is not utterly essential to performance, it is preferred because it produces holes which appear to allow the release of gas and moisture during frying. This helps to reduce excessive blistering, ballooning or delamination of the upper portion of the pizza shell from the lower portion. It was found that one inch spacing betwen docking holes works better than a two inch spacing. The holes produced by the ⅛" diameter docking pins extend all the way through the pizza shell from the top surface through the bottom surface.

The frying time and temperature are inversely related with longer cooking times required for lower fat temperature. Due to the reduced life of the frying oil at higher temperatures, it was decided that a frying temperature of about 400° F. is preferred for the particular fat used, hydrogenated soybean oil. At this temperature, the cooking time is preferred to be between about 20 to 60 seconds with about 35 to 45 seconds being most preferred. The most successful temperature range is from about 375° F. to about 425° F. with shorter frying times at the higher temperatures. It was discovered that faster frying at higher temperatures reduces oil absorption and that by frying at 400° F. or more the amount of oil absorbed during frying can be held to less than 10% of the total weight of the cooked pizza shell.

It was discovered that increasing the water level of the dough is a major factor in producing blisters effectively particularly when used with higher yeast levels. It appears that this combination (higher water and yeast) produces an improved cell structure development and a bready character which is desirable. The higher water levels also cause the edges of the pieces to be sharper and the visual appearance of the surface to be uneven. Hence, it was discovered that the higher water and yeast levels namely 1.28% yeast and 36.06% water when used together produce better results than the lower levels. On the other hand, too much water is undesirable since the dough can then not be sheeted or handled.

The weight of cut pieces of a constant diameter say 10 inches in diameter was varied from 150 grams to 200 grams. It was found that the increased weight will produce greater final dough moisture and a more bready texture in the final product. Whether this is desirable or not depends to a great extent upon personal taste. Higher dough weights also tend to produce a gummier, heavier and less greasy product with a moister texture and smaller blister cavities like 38 in FIG. 3 When the finished pizza shells are cut in half, it can be seen that the interior is more filled in, contains fewer large holes and the blisters are smaller in size. The best dough weights appear at the present time to be about 150 grams to 175 grams for a 10" pizza shell.

Figure 6:
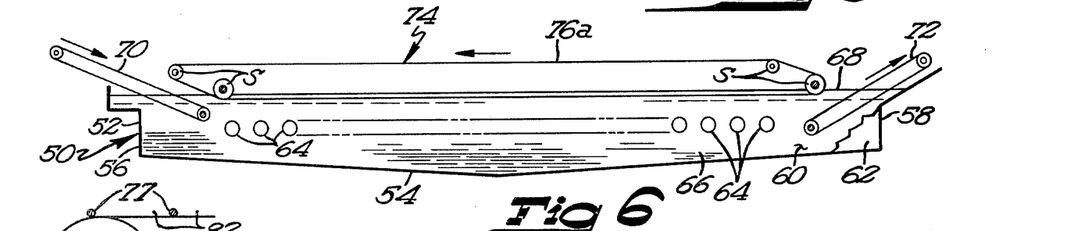
FIG. 6 is a vertical longitudinal diagramatic view of a frying apparatus used in preparing fried products in accordance with the invention.

Refer now to FIG. 6 which illustrates one preferred method for frying products in accordance with the invention. A fat fryer 50 is composed of an elongated trough or tank 52 including bottom wall 54, end walls 56 and 58, sidewalls 60 and 62 and gas fired heated tubes 64 all of conventional well known construction. The tank 52 is filled with cooking oil or fat 66 to the level 68. The surface 68 of the fat is adjusted to at least partially cover the product to thereby fry all surfaces of the dough shell. At the left or inlet end of the tank is an inlet conveyor 70 which is inclined downwardly toward the surface of the fat 66 at the left end of the tank. Similarly, at the outlet end of the apparatus is an inclined outlet conveyor 72 for removing product from the frying tank after frying has been completed. The conveyors include the usual sprockets and a suitable drive mechanism (not shown) for advancing them in the proper direction and speed. Wire conveyors 70 and 72 can be composed of parallel laterally extending wires about ¼ inch apart.

Extending the length of the tank is a submerger conveyor 74 which functions as a means for at least partially confining the product to control blister development.

Figure 10:
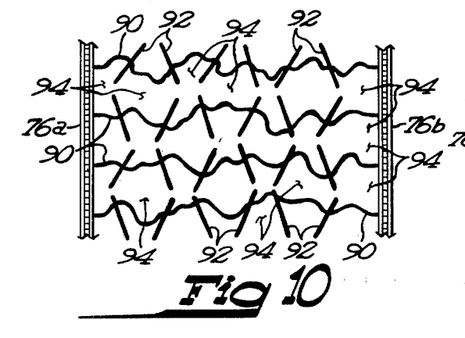
FIG. 10 is a view similar to FIG. 9 of a modified form of frying conveyor in accordance with the invention.

The conveyor 74 in a typical application includes a pair of laterally spaced apart parallel endless conveyor elements such as chains 76a and 76b only one of which can be seen in FIG. 6 entrained over laterally spaced and laterally aligned drive sprockets S adjacent each end of the tank. It will be seen that the lower runs of the chains 76 are positioned in the proximity of the surface of the fat and preferably slightly below the surface. Between the chains 76 are dough product engaging members such as wires 77 and 79 having openings 82 between them which function as recesses adapted to allow upward expansion of the bumps or blisters 16 as the dough product is fried. Wires 79 are welded to wires 77 and extend a short distance longitudinally. Because their ends are aligned as seen in FIG. 10, wires 79 act as several long wires. The size of the openings 82 in the conveyor 74 can be varied widely. The best results have been obtained with openings in the preferred range of about 1 to 3 inches across, the most preferred being about 1½ to 2½ inches across. In this way the blisters 16 expand until they reach a more or less hemispherical shape and then stop. Larger openings 82 produce blisters of greater height and openings 82 of a smaller size reduce blister height. Thus, the dough engaging members i.e., wires 77 and 79 function to control the development of the blisters 16. Since the dough will expand as it is fried only to a certain point, it was discovered that the maximum height the blisters 16 reach can be reliably controlled and maintained even though there is no top or plate to prevent too much expansion. Thus the overall thickness of the fried dough shell is maintained as desired. It can also be seen that the pattern of recesses produced by the submerger conveyer 74 and the product engaging members 77 and 79 cause a corresponding pattern to form in the upper surface of the fried dough shell with the same configuration of that of the openings 82 in the submerger and the expansion of gas and vapor within the product during frying causing the blisters to expand upwardly and to project through openings 82 of the submerger member. It will thus be seen that the connecting ligaments 26 or 36 that have been found so helpful in preventing delamination are formed by and correspond in location to the dough engaging members 77 and 79 between the recesses 82. The product is also characterized by having well developed grooves or recesses 17 in the top surface between the blisters 16 in alignment with the dough engaging members or wires 77, 79.

One aspect of the present invention is the reduction of the final fat content from about 22% in a Neopolitan pizza to half this amount, say 8% or 10%. This is accomplished in accordance with the present invention by a combination of using relatively high yeast content together with a relatively high water content, decreased proofing time and decreased frying time at a higher fat temperature. To effectively reduce the fat absorption, the water should be above 34% by weight and preferably on the order of about 36% to 38% while the yeast content should be above 1%. Excellent results have been achieved with about 1.25% yeast. The proof time has an effect on fat absorption and it was discovered that for a substantial fat reduction, a proof time of less than 10 minutes and preferably on the order of 5 minutes is best. A fat temperature of about 375° F. to 425° F. and preferably around 400° F. for 40 seconds is preferred for submerged frying. With this combination of conditions and ingredients, fat absorption was reduced surprisingly to about 9% by weight.

Excess oil is removed from the surface of the product after frying in any desired manner for example by draining, shaking or by directing a jet of vapor or gas on the product to strip excess fat. One preferred method is to employ an inert gas or steam for this purpose.

After frying, heat is removed by cooling the product either by letting it stand in the air or passing it through a cooler. The latter is preferred for high scale production.

Frying produces a relatively dense fat fried crust on all surfaces of the product. The density of the crust is greater than the density of a cooked interior dough which has a breadlike character. Even after excess fat is removed, a portion of the frying fat remains on the exposed surface of the fried dough shell and a fraction remains inside the surface layer of the dough because as the product is fried the heat of the fat tends to drive moisture out of the surface layer of the product. This is largely replaced by a layer of absorbed fat which helps to make the surface crisp and dry after reheating. The displacement of moisture from the crust surface and its replacement by a layer of fat located between the interstices of the crust is surprisingly effective in preventing migration of moisture from the topping to the crust during storage and reheating. The crust is thus perceived to be much crisper than a conventional oven baked pizza shell after reheating. The cool fat on the surface of the product as well as that which has penetrated the surface of the crust seems to provide a moisture retardant sealing layer of water immiscible material which retards the transfer of moisture from the pizza or other topping into the dough thereby reducing the tendency for the crust to become soggy.

It is preferred to freeze the product because in addition to preventing deterioration it preserves the shape of the upwardly projecting blisters on the top surface as well as the irregularities on the lower surface. This is important because the blisters are perceived to have excellent eating characteristics by most persons and irregularities on the lower surface of the product define the air channels between the pizza and a supporting cookie sheet used to reheat the pizza so as to promote air circulation and maintain crispness.

As seen in FIG. 6 uncooked fresh dough pieces are carried downwardly on an incline by conveyor 70 into the hot fat 66 and beneath the submerger conveyor 74. The dough is then buoyed upwardly by the buoyancy force of the fat against the bottom of the submerger. The expansion of the blisters upwardly between the dough engaging members 77, 79 can be clearly seen in FIG. 7. The engagement of the blisters in the recesses or openings 82 have a dual function in that it provides a way of controlling blister development particularly the height of the finished piece while at the same time providing a means of frictional engagement between the product and the conveyor so as to reliably advance the product through the fat and prevent slippage. After the product reaches the exit end of conveyor 74 it is carried out of the fryer by conveyor 72.

Refer now to FIG. 10 which shows an alternative form of submerger conveyor. The submerger conveyor illustrated in FIG. 10 comprises a plurality of transversely extending metal wires or rods 90 having random bends. The ends of the wires 90 are secured to the endless chains 76. Secured rigidly as by welding to the rods 90 are randomly oriented generally longitudinally extending wires segments 92 which define randomly shaped and randomly spaced openings 94 through which the blisters expand upwardly during the frying operation. It can thus be seen that the blisters can be uniformly spaced, randomly spaced or even arranged in an artistic pattern.

Figure 11:
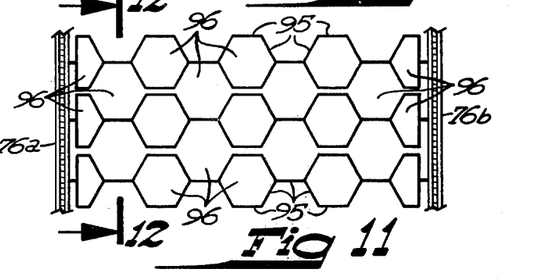
FIG. 11 is a partial plan view of still another modified form of conveyor that can be used in the invention.
Figure 12:
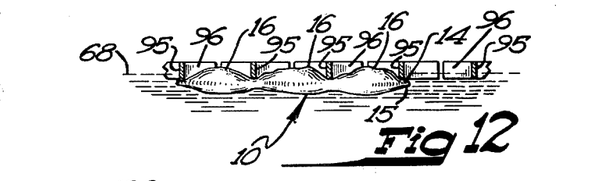
FIG. 12 is a partial vertical sectional view taken on line 12—12 of FIG. 11.

Another form of hold down conveyor is shown in FIGS. 11 and 12. As seen in the figures, the chains have mounted between them aligned sets of sheet metal article engaging members 95 formed in a hexagonal pattern with blister expansion recesses 96 between them.

In operation, as the dough product is thus confined by the upward buoyant force of the fat and the downward force of the hexagonally shaped crust members 95, blister will quickly form and expand upwardly into the recesses 96 thereby providing the desired light, delicate and crisp structure that is so important to the success and improved texture of the product while at the same time providing frictional engagement to convey the product through the fat from one end of the fry tank to the other.

Figure 13:
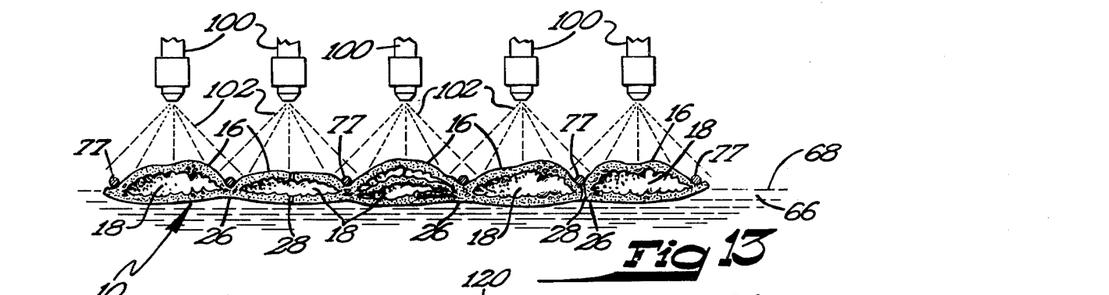
FIG. 13 is a partial vertical sectional view of a modified frying process in accordance with the invention.

In FIG. 13, the pizza 10 and the conveyor 74 are the same as already described in connection with FIGS. 1, 2 and 6 through 9 and the same numbers refer to corresponding parts. However, the surface 68 of the fat 66 has been lowered so that the pizza 10 is essentially floating on top of the fat with its upper surface 14 above the surface 68 of the fat 66. To cook the top of the pizza 10 a plurality of hot fat nozzles 100 is provided, each of which directs a stream of hot fat 102 downwardly onto the upper surface of the product as it is conveyed from left to right by the conveyor 74. In this way the top is fried at the same time as the bottom and the heat of the fat expelled from the nozzles 100 cooks the top surface 14 of the pizza 10 while the hot fat 66 in the tank cooks the bottom surface. The nozzles 100 are located throughout substantially the entire length of the fryer although only a few are shown.

Figure 14:
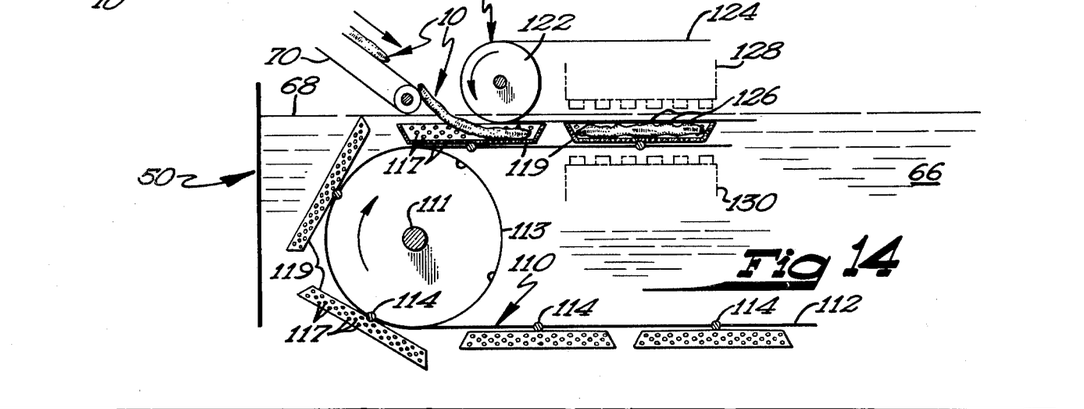
FIG. 14 is a partial vertical longitudinal sectional view illustrating another method of frying dough products in accordance with the invention.

Refer now to FIG. 14 which illustrates a modified form of fryer in accordance with the invention in which the same numbers refer to corresponding parts already described.

The tank 50 and conveyor is the same as already described. Positioned within the tank 50 below the level of the fat 66 is a conveyor 110 comprising a pair of laterally spaced parallel endless chains 112 entrained over laterally spaced sprockets 113 only one of each is shown journaled for rotation on an axel 111 that is driven by means of an electric motor (not shown) in the proper direction to carry products from left to right. Mounted upon the chains 112 by means of brackets 114 are a plurality of cup shaped article receiving baskets or trays 119 each of which can be provided with punched perforations 117 to promote fat circulation through the baskets. Mounted over the tank is a second conveyor 120 comprising a pair of transversely extending parallel and longitudinally spaced drums 122 only one of which is shown over which is entrained an endless conveyor belt 124 formed for example from fine wire mesh or flexible sheet metal either perforated or unperforated. As shown in the figures, conveyor 110 extends further to the left than conveyor 120. As a result, each fresh piece of uncooked dough 10 will slide into a tray 119 from conveyor 70 and after entering the tray will be covered by the belt 124. In this case the tray 119 and the belt 124 together act as a means for confining the dough product so that blister development is controlled. As the product is fried, the blisters 126 which form therein are entirely random in distribution but are confined vertically so that the overall height of the finished fried dough product will be maintained at the predetermined value.

In a modified form of the apparatus, shown in FIG. 14, the tank 68 is empty and fat is applied through upper and lower spray nozzles 128, 130 located at longitudinally spaced apart locations extending throughout substantially the length of the fryer. When the hot fat from the nozzles 128, 130 strikes the product, frying is accomplished just as if it were immersed in the fat as described above.

The term "frying" herein is used in the broad sense of exposing the surface of the product to a non-aqueous fluid heating medium to produce intense surface heating. While fat is preferred, other liquids can be used like the polyhydroxy alcohols including mannitol, sorbitol and mixtures thereof. When mannitol is used, it can be heated to about 400° F. and frying carried out for about 40 seconds. Another heating medium that can be used is superheated steam such as steam at about 400° F. for one minute. Since the steam when superheated contains no moisture droplets or other moisture in liquid form, it can be thought of as a non-aqueous fluid heating medium.

Fat is preferred to other heating fluids because other fluids can add an undesired taste to the product and extra steps such as fat addition are required. Accordingly, hot fat is highly preferred to other frying media.

Among the many variations that can be made in the invention is the use of microwave heating either for proofing or cooking. However, microwave proofing does not seem to produce any advantages over ordinary proofing and is in most cases more expensive at the present time and accordingly is not preferred. When mirowave cooking is used, the blisters that form are not as well developed, not as uniform in height or distribution as achieved in the fryer described in FIG. 6 through 10. Moreover, surface fat addition must be carried out as a separate step in the process and the final product is not as well liked as that described above.

The invention will be better understood by reference to the following examples:

EXAMPLE 1

Dough is prepared using the following formula:

|  | lbs/batch | % by wt. |
|---|---|---|
| Wheat Flour | 600.0 | 60.65 |
| Water | 356.6 | 36.04 |
| Yeast (Dry) | 12.7 | 1.28 |
| Salt | 9.2 | .93 |
| Dough Conditioner (Sodium stearoyl 2 lactylate e.g. Reduce 150 by Patco Co., Kansas City, Mo.) | 3.0 | .30 |
| Soy Oil | 7.9 | .80 |
|  | 989.4 | 100.00 |

Figure 7:
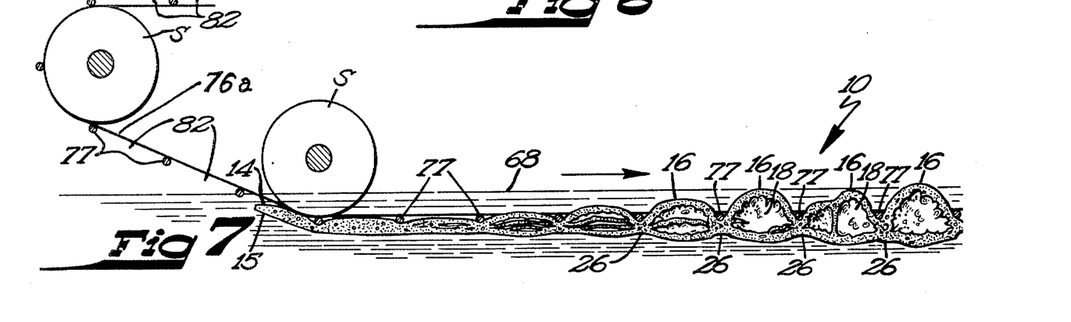
FIG. 7 is an enlarged partial longitudinal vertical sectional view of a pizza crust as it is being fried in accordance with one embodiment of the invention.
Figure 8:
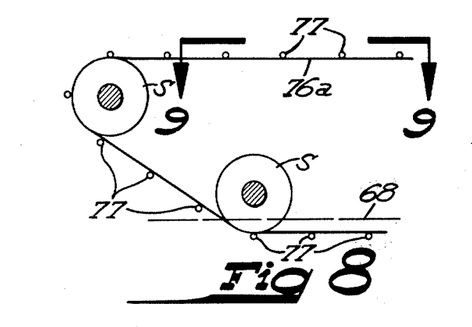
FIG. 8 is an enlarged partial vertical sectional view of the conveyor used for transporting product through the frying fat.
Figure 9:
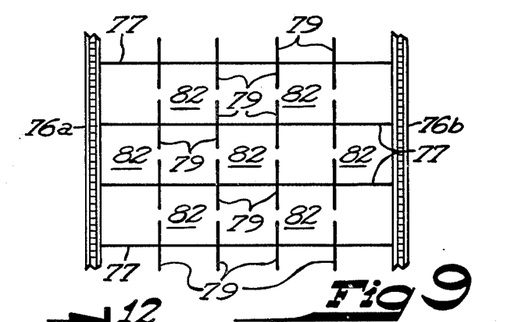
FIG. 9 is a partial horizontal plan view taken on line 9—9 of FIG. 8.

The ingredients are weighed and placed in the mixer which is run at low speed for two minutes and high speed for four minutes. The dough is then dumped into an oiled trough and allowed to rest for 40 minutes. After mixing, the dough temperature is 85° F. The dough is then sheeted to a thickness of 3 mm. inches, docked with ⅛ inch diameter docking pins set at 1 inch apart and cut into circular pieces ten inches in diameter weighing 170 grams each. The pieces are conveyed through a proofer and proofed for five minutes at 115° F. They are then conveyed through a fryer as shown in FIGS. 6 and 7 and fried for 40 seconds at 400° F. The submerging conveyor is composed of wires spaced to provide openings for blisters measuring 1¼ in. × 1¼ in. The oil level is about ¼ inch above the top of the pieces of dough. The resulting fried dough shells are generally flat and contain a moist, tender bready interior having pores many of which are in the range of 1/32 inch to 1/16 inch in diameter. The surface is a relatively dense crust containing absorbed fat. The total fat content is 9%. The dough shells contain a plurality of upwardly extending generally dome shaped hollow bumps or blisters having a predetermined maximum height. The average maximum height of a large number of these pizzas was 0.84±0.10 inches. None exceeded 0.94 inches. The cavities inside the blisters are usually over ten times greater in diameter than the pores and many were up to about ⅜ inches in height. Ligaments of cooked bready dough between the blisters prevent the upper crust from delaminating from the lower crust. Hard cooked rivet-like dough around the docking holes aid further in preventing delamination. The fried shells are passed through a cooler at a temperature of 35° F. until their temperature has reached 50° F. A pizza topping is then applied and the complete pizzas are frozen.

EXAMPLE 1A (Comparative Example)

For comparative purposes a commercially prepared oven baked and frozen pizza* was presented to a taste panel with the product of Example 1 and a Neopolitan pizza made from the same dough as Example 1 formed by hand from a dough ball of about the same weight as the invention and varying in diameter when finished from 6½ to 7 inches. The same topping was used on all products. In the Neopolitan pizza, delamination could only be prevented by repeatedly poking the dough with a fork as it was fried first on one side and then on the other.

*Totino's Company 10 inch Party Pizza.

The invention was perceived to be thicker although it was actually not. It was also regarded to be more fragile, i.e., cracker-like than the others and to have more air pockets. It was also perceived to be less moist than either of the other pizzas and much crisper than the commercial pizza. The invention was rated as crisp as the Neopolitan pizza but had only about half the fat content; 9% versus 20% for the Neopolitan pizza. Unlike the Neopolitan pizza, the invention had a uniform height and shape allowing it to be packaged in boxes. The height range for the Neopolitan pizza was about 37% greater than the height range of the invention.

EXAMPLE 2

Prepare dough shells as in Example 1 except that wheat flour content is 55% by weight, water is 40% by weight, no oil is used, and yeast is 4.5% by weight. This dough, because of the high water content is rather soft for processing but blisters develop very well and the texture is more bready than Example 1.

EXAMPLE 3

Compound dough as in Example 1 except that the wheat flour content is 68% by weight, water is 30% by weight, yeast is 1%, soy oil is 0.5% and seasoning comprises 0.5%. The dough is less sticky and more firm than in Example 2 but blisters are smaller and more crackery in texture.

Mix the dough as in Example 1 except that the water content is 40% by weight, flour is 55% by weight, yeast is 2%, salt 0.5% by weight, soy oil 2.5%. The dough is similar to that in Example 1.

EXAMPLE 4

Prepare dough as in Example 1 except that the amount of flour is 68% by weight, water is 26% by weight, soy oil is 2%, dry yeast 2%, emulsifier is 0.2% and the balance is seasoning. This dough is fairly dry and blisters are smaller than in Example 1.

EXAMPLE 5

Pizzas are prepared as in Example 1 except that melted butter is applied to the top of the dough shells and a mixture of cinnamon and sugar is sprinkled over them.

EXAMPLE 6

Pizzas are prepared as in Example 1 except that the frying is carried out as illustrated in FIG. 14 at 400° F. for 40 seconds.

EXAMPLE 7

Frying is carried out as in Example 6 except that frying is carried out at 375° F. for 60 seconds.

In a second run, frying is carried out at 425° F. for 30 seconds.

EXAMPLE 8

Fried dough shells are prepared as in Example 1 except that instead of applying the pizza topping, a sugar glaze is applied to the top crust of the finished fried shells.

EXAMPLE 9

Dough shells are prepared as in Example 1 except that icing is applied to the top crust instead of a pizza topping.

EXAMPLE 10

Dough shells are prepared as in Example 1 and divided into two batches. A fruit topping is applied to one batch and jelly is applied to the second batch. The finished products are frozen after being topped.

EXAMPLE 11

Pizza is prepared as in Example 1 except that frying is performed as in FIGS. 11 and 12 at 400° F. for 40 seconds and in a second run with randomly distributed blisters as in FIG. 14 at 400° F. for 45 seconds.

EXAMPLE 12

Dough shells are prepared as in Example 1 but with randomly shaped upwardly extending blisters using the apparatus of FIG. 10.

What is claimed

1. A process of preparing a fried dough shell comprising: providing a sheet of dough, piercing the dough sheet to provide a plurality of spaced-apart holes which extend all the way through the dough sheet from the top surface through the bottom surface; frying the dough sheet to form blisters therein and to cook the interior of the dough sheet to a moist, tender, bready consistency and form a surface crust thereon, the density of the crust being greater than the density of the cooked dough within the interior of the sheet; and engaging said dough sheet during said frying with a confining member which prevents said blisters from projecting beyond a maximum height, at least some of said holes being hardened by said frying to provide a rivet-like bond between upper and lower surfaces of the dough sheet which prevents delamination of said surfaces.

2. The process of claim 1 wherein frying is carried out with hot fat.

3. The process of claim 1 wherein said frying of said dough sheet is carried out in a polyhydroxy alcohol.

4. The process of claim 1 wherein said frying of said dough sheet is carried out in superheated steam.

5. The process of claim 1 wherein said confining member has a plurality of recesses therein and dough engaging members between the recesses, said blisters projecting upwardly between the dough engaging members into at least some of said recesses while the dough engaging members restrain the dough to form connecting ligaments between the blisters the pattern of blisters and connecting ligaments in the dough surface respectively matching the pattern of recesses and dough engaging members in the dough confining member, the maximum height of said blisters being determined by the size of said recesses.

6. The process of claim 1 wherein the fried dough sheet is frozen after frying.

7. The process of claim 1 wherein the fried dough sheet is allowed to cool, a topping is applied thereon and the topped dough sheet is frozen.

8. A process of preparing a fried dough shell comprising: providing a sheet of uncooked, farinaceous dough; piercing the dough sheet to provide a plurality of spaced-apart holes which extend all the way through the dough sheet from the top surface through the bottom surface; providing a frying vessel filled with heated fat; providing a dough sheet confining member having a plurality of openings and dough engaging members between the openings; placing the dough sheet in the heated fat; and holding the sheet in the heated fat by means of said dough engaging members to thereby fry said sheet and cook the interior to a moist tender, bready interior and form a relatively dense surface crust thereon, the expansion of gas and vapor within the dough sheet during frying causing blisters to form in the sheet which expand upwardly between the dough engaging members and project into at least some of the openings while the dough engaging members restrain the dough to form connecting ligaments between the blisters, the pattern of blisters and connecting ligaments in the dough surface respectively matching the pattern of openings and dough engaging members in the sheet confining member, the maximum height of said blisters being determined by the size of the openings, at least some of said holes in the dough sheet being located in said ligaments and hardened by said frying to provide a rivet-like bond between upper and lower surfaces of the dough sheet which prevents the delamination of said sheet surfaces.

9. The process of claim 8 wherein the dough confining member is moved horizontally through the fat in the frying vessel to thereby advance the sheet from one end of the frying vessel to the other and the upwardly extending blisters projecting into the openings in the confining member provide enough friction between the confining member and the dough sheet to carry the sheet from one end of the frying vessel to the other without slipping relative to the confining member.

10. The process of claim 8 wherein the dough sheet is removed from the fat fryer and a jet of gas or steam is directed at the sheet to strip excess fat from the surface thereof.

11. The process of claim 8 wherein the fried dough sheet is frozen after frying.

12. The process of claim 8 wherein a topping is applied to the fried dough sheet and the topped dough sheet is frozen.

13. A delamination resistant dough shell of predetermined thickness comprising: a generally flat, porous sheet composed of at least partially fried dough having a moist, tender, bready interior and a relatively dense crust on the upper and lower surfaces thereof, said fried dough sheet having a plurality of dome-shaped blisters therein, each blister having one or more cavities at least twice the size of said pores in the dough, the maximum height of said blisters being the same or less than the predetermined dough shell thickness, the top and bottom portions of each blister respectively comprising separated upper and lower surfaces of said sheet, said blisters being spaced apart from one another laterally by connecting ligaments wherein upper and lower surfaces are unseparated, said sheet also having a plurality of spaced-apart holes therein which extend all the way through the dough sheet from the top surface through the bottom surface, at least some of said holes being located in said ligaments and fried hard to provide a rivet-like bond between said upper and lower surfaces which prevents delamination of said surfaces.

14. The dough shell of claim 13 wherein an edible topping is applied thereupon.

15. The dough shell of claim 13 wherein fat is contained in the dough and additional fat is absorbed into the surface thereof.

16. The product of claim 14 wherein the dough shell and topping are frozen.

17. The dough shell of claim 13 wherein lower surface irregularities therein define a plurality of air channels between the dough shell and a support means supporting the dough shell during reheating, said channels promoting air circulation and improving crispness.

18. The dough shell of claim 13 wherein the size of said holes is from 3/32" to ¼".

19. The dough shell of claim 13 comprising pizza dough containing prior to frying about 55% to 68% by weight flour, about 26% to 40% by weight water and about 0.5% to 4.5% by weight yeast.

20. The dough shell of claim 13 in frozen form.

21. The dough shell of claim 20 having a topping on the upper surface thereof.

* * * * *